(12) United States Patent
Donovan et al.

(10) Patent No.: US 8,318,616 B2
(45) Date of Patent: Nov. 27, 2012

(54) SALT WATER SWELLABLE COMPOSITIONS AND ARTICLES

(75) Inventors: Michael Donovan, Huntley, IL (US); Jason M. Logsdon, Schaumburg, IL (US); Marek R. Mosiewicz, Chicago, IL (US)

(73) Assignee: Amcol International Corporation, Hoffman Estates, IL (US)

( * ) Notice: Subject to any disclaimer, the term of this patent is extended or adjusted under 35 U.S.C. 154(b) by 611 days.

(21) Appl. No.: 12/543,757

(22) Filed: Aug. 19, 2009

(65) Prior Publication Data

US 2011/0045726 A1 Feb. 24, 2011

(51) Int. Cl.
  *B32B 5/22* (2006.01)
(52) U.S. Cl. ............ 442/86; 428/41.8; 428/912; 106/33
(58) Field of Classification Search ............... 442/86; 428/41.8, 912; 106/33
  See application file for complete search history.

(56) References Cited

U.S. PATENT DOCUMENTS

| | | |
|---|---|---|
| 3,558,545 A | 1/1971 | Lummus |
| 3,949,560 A | 4/1976 | Clem |
| 3,986,365 A | 10/1976 | Hughes |
| 4,021,402 A | 5/1977 | Clem |
| 4,048,373 A | 9/1977 | Clem |
| 4,103,499 A | 8/1978 | Clem |
| 4,202,413 A | 5/1980 | Messenger |
| 4,344,722 A | 8/1982 | Blais |
| 4,467,015 A | 8/1984 | Clem |
| 4,501,788 A | 2/1985 | Clem |
| 4,534,926 A | 8/1985 | Harriett |
| 4,565,468 A | 1/1986 | Crawford |
| 4,634,538 A | 1/1987 | Alexander |
| 4,656,062 A | 4/1987 | Harriett |
| 4,668,724 A | 5/1987 | Harriett |
| 4,693,923 A | 9/1987 | McGroarty et al. |
| 4,773,989 A | 9/1988 | Pfalzer et al. |

(Continued)

FOREIGN PATENT DOCUMENTS

DE 3704503 A1 8/1988

(Continued)

OTHER PUBLICATIONS

International Preliminary Report on Patentability for PCT/US2010/041885 mailed Nov. 17, 2011.

*Primary Examiner* — Elizabeth Cole
(74) *Attorney, Agent, or Firm* — Marshall, Gerstein & Borun LLP

(57) ABSTRACT

The compositions, articles and methods described herein remain intact for sealing between and around structures that contact salt water. The compositions include: (i) a partially cross-linked polyacrylamide/partially neutralized polyacrylic acid copolymer; (ii) a smectite clay; (iii) an elastomer, e.g., butyl rubber; (iv) a polyolefin polymer or copolymer; and (v) a cationic flocculant, the compositions have exceptional and unexpected free swell and cohesiveness when in contact with high conductivity water or multivalent ion-containing-contaminated water. The articles of manufacture described herein all include a combination of (i) a partially cross-linked acrylamide/acrylate/acrylic acid copolymer; (ii) a smectite clay; (iii) an elastomer, e.g., butyl rubber; (iv) polyisobutene or polyisopropene; and (v) a cationic flocculent, and are used for waterproofing against high conductivity salt-containing water preferably when used in putty-like or paste-like consistency to fill areas between and around structures, e.g., to surround a pipe inserted in a concrete wall, or to seal between two concrete sections.

32 Claims, 1 Drawing Sheet

U.S. PATENT DOCUMENTS

| | | |
|---|---|---|
| 4,787,780 A | 11/1988 | Harriett |
| 4,810,573 A | 3/1989 | Harriett |
| 5,041,330 A | 8/1991 | Heerten et al. |
| 5,317,834 A | 6/1994 | Anderson |
| 5,389,166 A | 2/1995 | White |
| 5,578,219 A | 11/1996 | Kajita |
| 5,580,630 A | 12/1996 | Byrd |
| 6,610,780 B1 | 8/2003 | Payzant et al. |
| 6,783,802 B2 | 8/2004 | Darlington, Jr. et al. |
| 2003/0144401 A1* | 7/2003 | Ajbani et al. ............ 524/445 |
| 2005/0065266 A1* | 3/2005 | Yang et al. ............... 524/445 |
| 2007/0044528 A1 | 3/2007 | Kitchen |
| 2009/0130368 A1 | 5/2009 | Beihoffer et al. |

FOREIGN PATENT DOCUMENTS

| | | | |
|---|---|---|---|
| EP | 0645181 A2 | 3/1995 | |
| EP | 1616906 A1 | 1/2006 | |
| GB | 1029513 A | 5/1966 | |
| GB | 1059363 A | 2/1967 | |
| GB | 1129840 A | 10/1968 | |
| GB | 2202185 A | 9/1988 | |
| JP | 2006241210 A | * | 9/2006 |

* cited by examiner

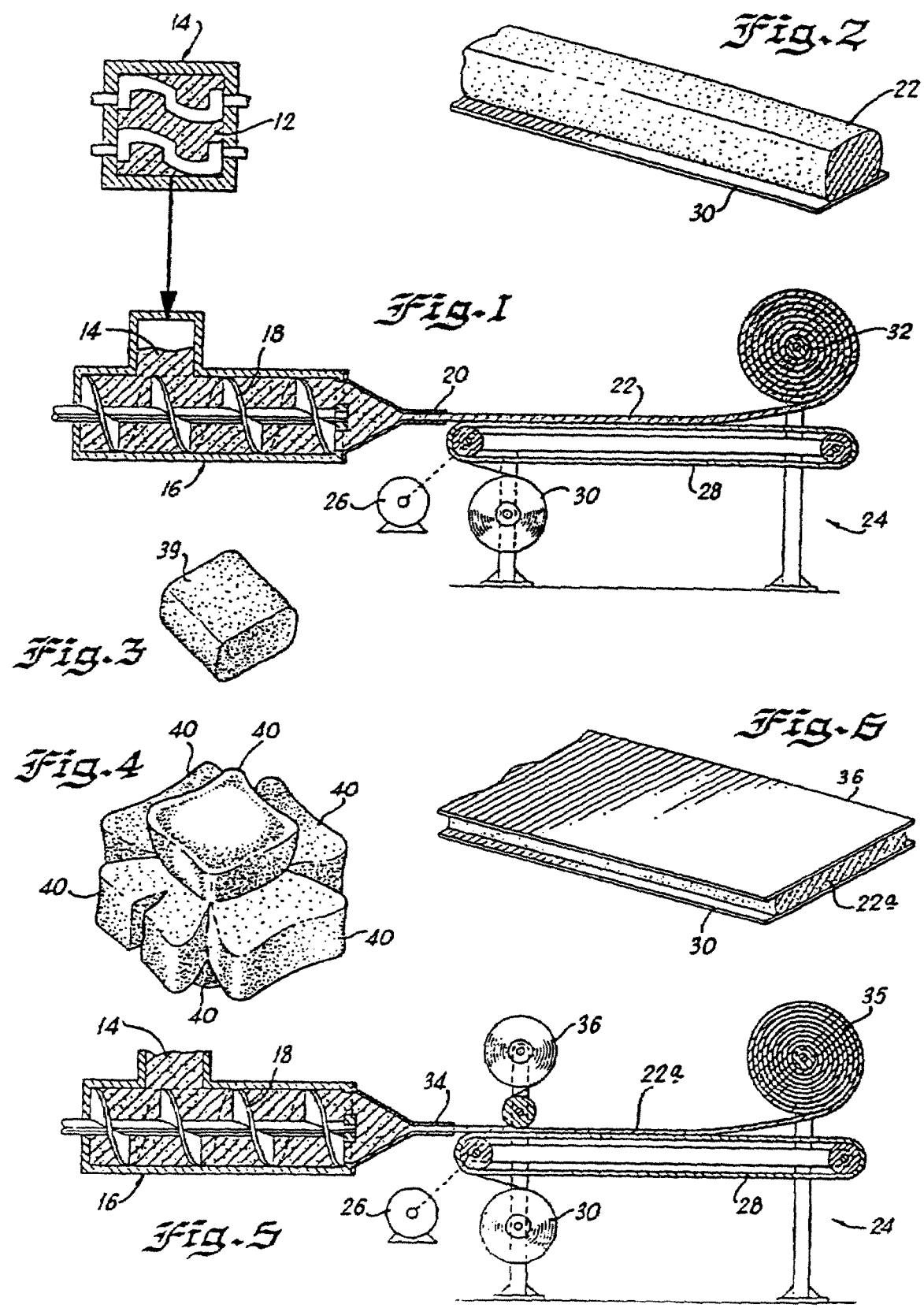

SALT WATER SWELLABLE COMPOSITIONS AND ARTICLES

FIELD OF THE INVENTION

The present invention is directed to compositions, methods and articles of manufacture useful as waterproofing compositions and articles for waterproofing surfaces against the penetration of high conductivity salt-containing water, e.g., bay water, groundwater, marsh water, brackish water, ocean water, and mining waste water. These compositions and articles are useful in the formation of waterproofed construction areas subjected to contact with high conductivity waters such as ocean water, lagoons, hazardous or toxic waste containment areas, subterranean foundation surfaces and the like. More particularly, the present invention is directed to salt-water waterproofing compositions and articles of manufacture that include: (i) a partially cross-linked polyacrylamide/partially neutralized polyacrylic acid copolymer; (ii) a smectite clay; (iii) at least one elastomer, e.g., butyl rubber; (iv) at least one plasticizing agent such as polyisobutene (aka polyisobutylene) or polyisopropene; and (v) a cationic flocculant. These compositions can have a "putty-like" or "paste-like" consistency, or can be extruded into a flexible "rope" configuration, or can be shaped into sheet materials; and can be carried by a woven and/or non-woven fabric.

BACKGROUND OF THE INVENTION AND PRIOR ART

Various polymers, swellable clays, and multi-layer articles of manufacture have been applied to the surface of soil to provide a waterproofing layer to prevent the penetration of water and/or hazardous or toxic materials into the earth, and to provide lagoons, ponds and other water-containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as sodium bentonite, have been manufactured by securing the water-swellable clay to major interior surfaces of flexible sheet materials, e.g., Clem U.S. Pat. No. 4,501,788, for application to the soil surface in abutting or overlapping relation to adjoining multi-layered articles. Examples of other flexible sheet materials containing adhesively secured water-swellable clays are found in the following Clem U.S. Pat. No. 4,467,015; McGroarty, et al. U.S. Pat. No. 4,693,923; Harriett U.S. Pat. No. 4,656,062; and Harriett U.S. Pat. No. 4,787,780.

U.K. published Patent Application GB 2,202,185A discloses a layer of water-swellable bentonite between flexible fabric layers that have been needle punched together in a needle loom that secures the upper and lower layers together, wherein at least one of the fabric layers is a non-woven textile material.

Another waterproofing barrier, disclosed in Blais U.S. Pat. No. 4,344,722, is constructed in the field by applying a first flexible, water-permeable fabric layer, overlaying a thickness of water-swellable clay material and applying an overlay of the same flexible, water-permeable fabric thereover. Other patents disclosing the use of water barrier layers for protecting a soil surface include British Patent Specification 1,059,363; British Patent Specification 1,029,513 and British Patent Specification 1,129,840.

German Patent DE 37 04 503 C2 discloses an article having two fabric layers including one non-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments. This assignee's U.S. Pat. No. 5,389,166, hereby incorporated by reference, describes incorporating a water swellable clay into a mat while laying down fiber to form the mat.

While the articles described in the above-mentioned patents are effective for waterproofing against the penetration of relatively non-contaminated water, they are unable to prevent the penetration of salt (e.g., NaCl) containing water, such as ocean water.

This assignee's application Ser. No. 11/942,638, filed Nov. 19, 2007, hereby incorporated by reference, discloses salt water-swellable acrylate copolymers that swell in contact with salt-contaminated water. As disclosed in this application, the copolymer is disposed against a membrane layer and serves to plug the membrane layer should the membrane develop a leak.

This assignee's research subsequent to filing Ser. No. 11/942,638 was directed to salt water-swellable compositions that would swell when in contact with salt-contaminated water, but would not require a contacting fabric or film layer, e.g., for plugging a space surrounding a pipe in a salt-water-contaminated area. This research revealed that the salt water-swellable acrylic copolymers disclosed in Ser. No. 11/942,638 would not remain sufficiently intact without an adherent fabric or film layer, e.g., for uses in rope or paste consistency form, such as disclosed in this assignee's U.S. Pat. Nos. 4,656,062; 4,810,573; 4,773,989; 4,787,780; 4,668,724; 4,534,926; and 5,580,630, each hereby incorporated by reference. Surprisingly, however, it was found that the composition could swell in contact with salt-contaminated water and stay cohesive so long as the composition includes (i) a cationic flocculant, together with (ii) partially netralized, partially cross-linked, water-insoluble acrylic acid/polyacrylamide copolymer, (iii) clay, (iv) an elastomer, such as butyl rubber and (v) a plasticizing agent such as polybutene, polypropene, polybutadiene, polyisobutene and/or polyisopropene. It should be understood that the compositions described herein can include one or more layers of woven or non-woven geotextile, and/or can include a layer of a water-soluble film, as disclosed and claimed in this assignee's U.S. Pat. No. 5,580,630, hereby incorporated by reference.

Surprisingly it has been found that compositions comprising (i) a partially cross-linked copolymer of acrylamide and partially neutralized polyacrylic acid, preferably a acrylamide/potassium acrylate, sodium acrylate/acrylic acid copolymer (CAS #312-12-13-2), e.g., STOCKOSORB, or STOCKOSORB S, or STOCKOSORB F from Stockhausen, Inc. of Greensboro, N.C.; together with (ii) a smectite clay; (iii) an elastomer, e.g., butyl rubber; (iv) a plasticizing agent such as polybutene, polypropene, polybutadiene, polyisobutene and/or polyisopropene; and (v) a cationic flocculant, will waterproof surfaces against the penetration of high conductivity water while remaining cohesive. The compositions and articles described herein are most useful to provide a water barrier against multivalent ion-containing water ("salt water") having a conductivity of at least 15 mS/cm, preferably at least 20 mS/cm, more preferably at least 30 mS/cm, even more preferably at least 40 mS/cm, and most preferably at least 50 mS/cm.

Super absorbent polymers ("SAPs") have been produced since the 1970s for use in a variety of products including, among others, hygiene products, such as disposable diapers, training pants, feminine hygiene products and incontinence devices, agricultural and horticultural products and industrial and environmental absorbents. SAPs are primarily utilized to increase or enhance the product's water-absorbency.

SAPs are produced from a variety of components by a variety of processes. For example, SAPs are often made from monomers such as acrylamide, acrylic acid and acrylate, which are particularly suitable for application in hygiene products.

Alternately, swelling clays, such as sodium smectite clays, e.g., sodium bentonite may be used to provide water-absorbency to a product. With respect to cost, the cost of swelling clays tends to be minimal compared to that of the chemical monomers described above. In addition, swelling clays are relatively stable compared to chemical monomers and are not as subject to degradation. However, swelling clays have a water absorption capacity significantly less than that of SAP, and like the common partially cross-linked partially neutralized acrylic acid copolymer SAPs, sodium smectites do not have sufficient free-swell when contacted by high conductivity salt water to act as a salt water barrier.

Some products include both an SAP and a swelling clay, as described in U.S. Pat. No. 6,610,780 and this assignee's U.S. Pat. No. 6,783,802, hereby incorporated by reference. Neither the SAPs nor the water-swellable clays, however, have been capable of waterproofing surfaces against the penetration of salt water, e.g., high conductivity, ion-contaminated water, such as ocean water.

It is well known that the montmorillonite group of clays hydrate and swell in fresh water but the swelling is substantially inhibited in salt water. Salt water is often encountered in the environments of use of bentonite clays where bentonite is advantageously employed for its swelling capacity, for example, as an additive in drilling muds for the purpose of sealing fissures in earthen formations surrounding the drill hole to prevent loss of drilling fluid; and in the sealing of lagoons and landfills. When contacted with salt water, the swelling capacity and stability of common montmorillonite clays are severely inhibited making it necessary to use much greater quantities of the clay to achieve the degree of swelling needed for sealing purposes. In some cases the palygorskite clays are used instead of the montmorillonite clays because of their better dispersing properties in salt water, as disclosed in U.S. Pat. No. 4,202,413.

In the past, modified bentonite clays have been developed by this assignee having a swelling capacity substantially less inhibited in salt water. Examples of such modified bentonites are the polymer treated bentonites disclosed in the Clem, U.S. Pat. Nos. 3,949,560; 4,021,402; 4,048,373 and 4,103,499.

The assignee's U.S. Pat. No. 4,634,538 teaches that one or more gums, such as xanthan gum, can be added to a water-swellable clay to improve its free swell when hydrated with salt water. This assignee's U.S. Pat. No. 5,578,219 describes impregnating a dried, water-swellable clay with an aqueous solution of a water-soluble polymer followed by re-drying to improve the ability of the clay to absorb contaminated water.

Partially cross-linked acrylamide/sodium or potassium acrylate/acrylic acid copolymers have been used for retention of water and plant nutrients in agriculture by mixing the copolymers in soil for contact with, and as a water and nutrient source for, plants roots, but have not been recognized to provide sufficient free swell when in contact with salt water for purposes of waterproofing salt water-contacting surfaces, as described in U.S. patent application Ser. No. 11/469,273 and U.S. Pat. No. 5,317,834.

This assignee also has a number of patents directed to fresh water-swellable compositions comprising a nonhydrated bentonite clay that is intimately contacted with a tackifying or plasticizing agent such as polybutene, polypropene, polybutadiene, polyisobutene and/or polyisopropene, or mixtures and admixed with an elastomer, such as butyl rubber, that is capable of fresh water swell and capable of stretching or expanding when hydrated with fresh water. See, for example U.S. Pat. Nos. 4,656,062; 4,810,573; 4,773,989; 4,787,780; 4,668,724; 4,534,926; and 5,580,630.

SUMMARY

The compositions, articles and methods described herein remain intact for sealing between and around structures that contact salt water. The compositions include: (i) a partially cross-linked acrylamide/partially neutralized acrylic acid copolymer; (ii) a smectite clay; (iii) an elastomer, e.g., butyl rubber; (iv) a plasticizing agent such as polybutene, polypropene, polybutadiene, polyisobutene and/or polyisopropene; and (v) a cationic flocculant, the compositions have exceptional and unexpected free swell and cohesiveness when in contact with high conductivity water or multivalent ion-containing-contaminated water ("salt water"). The articles of manufacture described herein all include a combination of (i) a partially cross-linked acrylamide/partially neutralized acrylic acid copolymer; (ii) a smectite clay; (iii) an elastomer, e.g., butyl rubber; (iv) a tackifying agent such as polybutene, polypropene, polybutadiene, polyisobutene and/or polyisopropene; and (v) a cationic flocculant, and are used for waterproofing against salt water preferably when used in putty-like or paste-like consistency to fill areas between and around structures, e.g., to surround a pipe inserted in a concrete wall, or to seal between two concrete sections. More particularly, the compositions described herein, in accordance with a preferred embodiment of the present invention, are incorporated into rope, rod, sheet or roll form as waterproofing articles; or are incorporated into deformable, putty-like consistency articles for waterproofing salt water-contacting concrete joints and the like (see U.S. Pat. No. 4,534,926, hereby incorporated by reference) by adding the agricultural grade SAPs described herein to the bentonite clay of the U.S. Pat. No. 4,534,926 patent and including a cationic flocculant. The sheet or roll form articles of manufacture described herein are self-healing (will seal cuts, cracks and fissures caused in adjacent water barrier sheets or films during or after installation) and are particularly effective in sealing seems between two substrates, e.g., concrete sections and between adjacent, geocomposite liners in contact with salt water.

In one embodiment, geocomposite articles that contain the compositions described herein are included as a safety layer under a separate, water barrier sheet material or membrane layer, such as a polymeric barrier layer, a woven or non-woven layer, and an intermediate layer of the compositions described herein that have sufficient free-swell when contacted by water such that if a crack or rupture occurs in the polymeric barrier layer, the confined composition will swell sufficiently upon salt water contact to fill the crack or rupture to heal the crack or rupture and prevent salt water leakage.

Another aspect of the articles and methods described herein is to provide a composition that has sufficient free swell when in contact with salt water such that the composition can provide a barrier to seal against penetration of the salt water without an adjacent water barrier layer.

The above and other aspects and advantages will become apparent from the following detailed description taken in conjunction with the drawings.

BRIEF DESCRIPTION OF THE DRAWINGS

FIG. 1 is schematic view of the apparatus used to manufacture one embodiment of the compositions and articles described herein;

FIG. 2 is a perspective view of a composition of the present invention formed into an elongated, rectangular (rope) shape;

FIG. 3 is a perspective view of a rectangular block of the composition of the present invention prior to hydration by salt water;

FIG. 4 is a perspective view showing the composition block of FIG. 3 after hydration by salt water;

FIG. 5 is a partially broken-away schematic drawing of the apparatus and composition used to manufacture the article of FIG. 6; and FIG. 6 is a partially broken-away perspective view of a sheet-like article.

DETAILED DESCRIPTION OF THE PREFERRED EMBODIMENTS

The compositions and articles described herein may be understood more readily by reference to the following detailed description and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used herein, the term "salt water" refers to aqueous solutions that contain acids, bases, and/or, preferably salts. Preferably, the salt water contains ions that for example can be $H^+$, $Na^+$, $K^+$, $Mg^{2+}$, $Ca^{2+}$, and/or $Al^{3+}$. One method for determining if a aqueous solution is salt water is through a conductivity measurement. Conductivity is a measure of the level of ion concentration of a solution. The more salts, acids or bases are dissociated, the greater the conductivity of the solution. In water or wastewater it is mainly a matter of the ions of dissolved salts, and consequently the conductivity is an index of the salt load in wastewater. The measurement of conductivity is generally expressed in S/cm (or mS/cm) which is the product of the conductance of the test solution and the geometric factor of the measuring cell. For purposes of this invention, salt water is defined as water with a conductivity greater than 15 mS/cm, preferably greater than 20 mS/cm, and more preferably greater than 25 mS/cm. Conductivity can be measured using a variety of commercially available test instruments such as the Waterproof PC 300 handheld meter made by Eutech Instruments/Oakton Instruments.

In the preferred embodiment, a composition containing (i) a water-insoluble, partially cross-linked acrylamide/partially neutralized acrylic acid copolymer; (ii) a smectite clay; (iii) an elastomer, e.g., butyl rubber; (iv) a plasticizing agent, e.g., polybutene, polypropene, polybutadiene, polyisobutene and/or polyisopropene; and (v) a cationic flocculent, is formed or extruded as a rope, rod or sheet material shape or as a layer between a water barrier sheet or film barrier layer, e.g., a polymer sheet material or membrane layer, and a woven or non-woven geotextile sheet material fabric layer. The polymer sheet material layer would be disposed in contact with salt water and the copolymer is disposed adjacent to the polymer sheet material layer between the membrane and the fabric layers to perform the function of a safety layer to prevent the flow of salt water through the article if the polymer sheet material layer is defective or develops a crack or hole during installation or during use. Alternatively, the copolymer can be incorporated into the interstices of the geotextile fabric layer to create a fabric/copolymer composite layer that serves as the safety layer attached to the membrane layer to prevent the flow of salt water through the article if the polymer sheet material layer is defective or develops a crack or hole during installation or during use.

The partially cross-linked acrylamide/partially neutralized acrylic acid copolymers, e.g., STOCKOSORB and/or STOCKOSORB S™ and/or STOCKOSORB F™ and/or acrylamide-potassium acrylate-acrylic acid copolymer, crosslinked (CAS#31212-13-2), have been found to have substantial free swell when contacted by high conductivity solutions, as described in this assignee's prior application, U.S. patent application Ser. No. 11/942,638 filed Nov. 19, 2007, hereby incorporated by reference. Examples of tested high conductivity aqueous solutions are 1% NaCl (conductivity of 18 mS/cm) and synthetic seawater (4.5% sea salt; conductivity of 53.2 mS/cm). The partially cross-linked acrylamide/partially neutralized acrylic acid copolymers provide substantial free swells when in contact with aqueous solutions contaminated with any, or a combination of, $Ca^{2+}$, $Al^{3+}$ and other multivalent cations in combination with anions that are common in sea water and other wastewaters. To achieve the full advantage of the compositions, articles and methods described herein, the partially cross-linked acrylamide/partially neutralized acrylic acid copolymers used in the compositions and geocomposite articles described herein should have a free swell in 4.5% by weight salt water of at least 35 ml per 2 grams of copolymer, preferably at least about 40 ml/2 grams, more preferably at least about 50 ml/2 grams. Free swells are determined by sprinkling 2 grams of powdered copolymer into a 100 ml graduated cylinder and filling the cylinder to 100 ml with 4.5% by weight salt water. The volume of copolymer that settles to the bottom of the graduated cylinder is then measured and is the free swell.

The copolymers described herein are lightly cross-linked, i.e., have a crosslinking density of less than about 20%, preferably less than about 10%, and most preferably about 0.01% to about 7%. The crosslinking agent most preferably is used in an amount of less than about 7 wt %, and typically about 0.1 wt %, based on the total weight of monomers. Examples of crosslinking polyvinyl monomers include, but are not limited to, di, tri or other multi-functional acrylic, methacrylic, vinyl ether or acrylamido functional compounds that are well known in the art for cross-linking acrylate polymers. Moreover, the copolymers described herein are preferably water-insoluble.

Typical particles sizes for the crosslinked copolymer particles can be from 1 micron to approximately 4000 microns. Preferred particle sizes are less than 200 microns. Suitable copolymers sizes include:

Stockosorb F: 0-200 micron
Stockosorb S: 200-800 microns
Stockosorb M: 800-2000 microns
Stockosorb C: 2000-4000 microns
Stockosorb 400 RD: 100-800 microns The relative amounts of the acrylamide and partially neutralized acrylic acid in the salt water-waterproofing copolymers described herein can vary widely from about 1 mole % to about 99 mole % of each in the copolymer. Best results for achieving excellent free swells in salt water are achieved where acrylamide forms about 5% to about 95 mole % of the copolymer, preferably about 15% to about 85 mole %, more preferably about 55 mole % to about 75 mole %, and even more preferably about 60 mole % to about 70 mole %; sodium and/or potassium acrylate (preferable forms of the partially neutralized acrylic acid) is about 1 mol % to about 50 mole % of the copolymer, preferably about 5 mole % to about 25 mole % of the copolymer; and acrylic acid forms about 0.1 mole % to about 50 mole % of the copolymer, preferably about 1 mole % to about 10 mole % mole of the copolymer. One of ordinary skill in the art would recognize an equilibrium between the acrylate and acrylic acid forms of the units in the copolymer, and an equilibrium between any agent used to shift the equilibrium and the acrylate and acrylic acid units. Thereby the best description of the polymer chain is dependant on the mole percentage of acrylamide, which will not change dependant on the concentration of acids or bases in solutions of the polymer. Other material compositions that give a free swell of greater than about 35 mL/2 grams material in 4.5% sea salt in water are envisioned for this invention. Other monomers can be present in the copolymer including acrylic and methacrylic esters and acids, and substituted acrylamide and methacrylamides provided that the other monomers do not detract from the ability of the copolymer to absorb high conductivity water.

In accordance with the present invention, the compositions described herein can have a desired consistency ranging from a soupy liquid to a relatively stiff putty-like and tacky solid and having new and unexpected capacity for swelling in salt water.

In accordance with another important embodiment of the present invention, an upper sheet material layer may be applied over, and adhered to the compositions described herein to form laminated articles of manufacture. The upper sheet material layer can be water-impermeable to provide two water-proofing layers. The upper sheet material layer, under ideal conditions and proper installation will, by itself, prevent water or other liquids from penetrating the laminate. Frequently, however, it has been found that imperfect installation, particularly at seams, permits water or other liquid to penetrate a water impermeable layer intended for water proofing. Additionally, sometimes cracks or fissures develop in a "water-impermeable" sheet material permitting water penetration.

It has been found, quite unexpectedly, that the bentonite compositions of the present invention will expand to an unexpected volume upon salt water contact while maintaining structural integrity to permanently fill any cracks, fissures or gaps left from improper installation, thereby acting as an unexpectedly effective safety valve to insure that the laminate self heals to prevent essentially all liquid penetration to an earthen structure or building material thereunder.

The salt water-swellable compositions described herein are particularly effective when applied to building materials, such as wood, concrete, rock and the like, since the composition is tacky and readily adheres to solid, stable structures.

The optional water impermeable upper sheet material layer can be any flexible, water impermeable sheet material, such as polyvinyl chloride, a polyolefin, such as polyethylene or polypropylene and the like. Generally, the thickness of the water-impermeable sheet material is on the order of about 3 mm to about 50 mm. While a release paper or fabric layer is not essential to the laminates described herein, one or the other permits the laminate to be rolled upon itself and easily unrolled and applied.

The geotechnical fabrics are substituted for the release paper when the laminate is applied over an earthen surface for ease of application. The fabric is left in place on the undersurface of the composition sheet when the laminate is applied over an earthen surface so that the laminate sheets can be shifted in proper adjacent positions to provide effective sealing between laminate sheets. Any suitable fabrics can be used for this purpose, particularly since the fabrics have no water-impermeability purpose other than to achieve proper installation. Suitable fabrics include woven and non-woven permeable and non-permeable fabrics made from polypropylene, polyesters, nylon, propylene-ethylene copolymers, polypropylene-polyamide copolymers, and the like. The geotechnical fabrics are preferred for their bacteriological and chemical resistance. The thickness of the fabric is not important and such fabrics generally are available in thicknesses of 3 mm to about 30 mm.

To achieve the full advantage of the compositions and articles described herein, the composition should include a primary plasticizing and tackifying agent such as polydiene, polybutene, polypropene, polybutadiene, polyisobutene and/or polyisopropene in an amount of at least 0.5% by weight, preferably about 5% to about 20% by weight of the composition. Additional (secondary) tackifiers compatible with the polybutene, polypropene, polybutadiene, polyisobutene and/or polyisopropene may be included for additional tack so long as the secondary plasticizer is included in an amount of at least about 4% by weight preferably about 5% to about 20% by weight of the composition. Additional compatible tackifiers may include, for example, aliphatic petroleum hydrocarbon resins such as polyterpenes, hydrogenated resins, and mixed olefins. The compositions described herein may also include a secondary plasticizing agent such as one or more low polarity plasticizers, such as epoxidized soybean oil; blown castor oil; an alkyl monester, such as butyl oleate; a long chain partial ether ester, such as butyl cellosolve oleate; long chain alkyl diesters, such as dioctyl adipate and/or dioctylphthalate; and a petroleum-derived plasticizer such as an aromatic-napthenic oil, a napthenic-aromatic oil, a napthenic-paraffinic oil, and/or a paraffinic oil. Generally, aromatic tackifiers are not suitable without the primary plasticizer since they will bleed to the surface of the composition and separate thereby reducing the handleability and consistency of the composition. Other additives such as thickening agents, fillers, fluidizers, tackifiers and the like may be added in a total amount up to about 20 wt. % of the composition to impart any desired physical characteristics to the composition. However, it has been found that the addition of a silicic filler, e.g. silicic acid or calcium silicate, substantially decreases the water-swellability of the compositions of the present invention. Accordingly, essentially no silicic filler should be added to the composition. Silicic filler added in an amount of only 1 wt. % reduces the water swellability of the compositions by about 10%; and 5 wt. % added silicic filler reduces the water swellability by about 20%. To achieve the full advantage of the present invention, the silicic filler, if any, should be 1 wt. % or less.

Fluidizers such as petroleum distillates or evaporative solvents such as mineral spirits may be added to the composition of the present invention to aid in mixing, but it is preferred to combine the composition components without such solvents. In any case, the polydiene, e.g., polybutene, polypropene, polybutadiene, polyisobutene and/or polyisopropene should be present in the final composition, after evaporation of any solvents volatalizable under ambient conditions, in an amount of at least 0.5% by weight.

In accordance with an important feature of the compositions and articles described herein, no additives are necessary to protect the compositions of the present invention since the plasticizers such as polybutene, polypropene, polybutadiene, polyisobutene and/or polyisopropene ("polyolefins") will completely wet out the smectite clay/SAP blend, e.g., bentonite, in amounts up to about 90 wt. % bentonite/SAP blend without inhibiting the swelling characteristics of the bentonite. Quite unexpectedly, the polybutene, polypropene, polybutadiene, polyisobutene and/or polyisopropene component increases the capacity of the smectite clay to swell while providing sufficient tack so that the composition can be easily adhered to, substantially, any surface over extended periods of time.

The preferred clay utilized in the compositions and articles described herein can be either a sodium montmorillonite or calcium montmorillonite. In accordance with one important embodiment of the present invention, the smectite clay is bentonite. A preferred bentonite is calcium bentonite which is basically a non-water-swellable montmorillonite clay of the type generally found in the Black Hills region of South Dakota and Wyoming. This clay has calcium as a predominant exchange ion. However, the smectite, e.g., bentonite clay utilized in accordance with this embodiment of the present invention may also contain other cations such as sodium, potassium, magnesium and/or iron. There are cases wherein a montmorillonite predominant in calcium ions can be converted to a sodium variety through a well known process called "peptizing". The clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The clay, i.e., bentonite, generally is finely divided as known for use in water barrier panels and the like, preferably 70% of the clay passes through a #30 mesh sieve, more preferably 70% of the clay passes through a #50 mesh sieve, even more preferably 70% of the clay passes through a #100 mesh sieve, and still more preferably 70% of the clay passes through a #200 mesh sieve (ASTM D 422).

The polybutenes, or polyisobutylenes (hereinafter "polybutenes") used in accordance with the principles of the present invention, generally comprise $(C_4H_8)_n$ where n ranges from about 6 to about 45, straight chain or branched, having average molecular weights in the range of about 300 to about 2,500. The commercially available useful polybutenes are predominantly of higher molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of bentonite included within the composition of the present invention.

The polypropenes or polyisopropenes (hereinafter "polypropenes") useful in accordance with the principles of the present invention generally comprise $(C_3H_6)_m$ where m ranges from about 7 to about 60, straight chain or branched, having molecular weights in the range of about 300 to about 2,500. The commercially available polypropenes useful in accordance with the present invention generally are amorphous in character and may be combined with up to about 10 wt. % of a suitable processing solvent, such as ligroin, although the polypropenes may be blended with the bentonite easily at elevated temperatures i.e. 200° C. without a solvent.

The polydienes useful in accordance with the preferred embodiment of the present invention generally comprise either $(C_5H_8)_x$ or $(C_4H_6)_y$ or polymers formed combinations of both monomers where the total of both x and y monomers ranges from about 150 to about 1100. Examples of these materials include polybutadiene and polyisoprene, commonly referred to as liquid rubbers. The liquid rubbers can also comprise copolymers with other monomers such as styrene.

To achieve the greatest swelling of the compositions of the preferred embodiment, the polypropene, polydiene or polybutene or mixtures should be present in the composition in an amount of about 8 wt. % to about 30 wt. % of the total swellable composition.

The salt water swellable compositions described herein have a cationic coagulant or cationic flocculant included in an amount of about 5% to about 35% by weight of the swellable composition; preferably about 5% to about 30% by weight. Suitable cationic, polymeric flocculants/coagulants include polyquatemium-1 (CAS#: 68518-54-7); polyquaternium-2 (CAS#: 63451-27-1); polyquaternium-4 (copolymer of hydroxyethylcellulose and diallyldimethyl ammonium chloride); polyquatemium-5 (CAS#: 26006-22-4); polyquaternium-6 (polyallyldimethylammonium chloride; polydimethyldiallylammonium chloride; Magnafloc 370 (CAS#: 26062-79-3); polyquatemium-7 (CAS#: 26590-05-6); polyquaternium-8 (poly((methyl, stearyl) dimethylaminoethyl methacrylate), polyquatemium-9 (polydimethylaminoethylmethacrylate bromide); polyquatemium-10 (CAS#s: 53568-66-4, 55353-19-0, 54351-50-7, 81859-24-7; 68610-92-4, 81859-24-7); polyquatemium-11 (polyvinyl-N-ethyl-methylpyrrolidonium); poly(ethyldimethylammoniumethylmethacrylate) sulfate copolymer), polyquatemium-12 (CAS#: 68877-50-9); polyquatemium-13 (CAS#: 68877-47-4); polyquaternium-14 (CAS#: 27103-90-8); polyquaternium-15 (CAS#: 35429-19-7); polyquatemium-16 (quaternary ammonium salt of methyl-vinylimidazolium chloride and vinylpyrrolidone) (CAS#: 95144-24-4); polyquatemium-17 (adipic acid-dimethylaminopropylamine polymer (CAS#: 90624-75-2); polyquaternium-18 (azelaic acid, dimethylaminopropylamine, dicholorethylether polymer, CAS#: 113784-58-0); polyquaternium-19 (polyvinyl alcohol, 2,3-epoxypropylamine polymer (CAS#: 110736-85-1); polyquatemium-20 (polyvinyl octadecylether, 2,3-epoxypropylamine polymer (CAS#: 110736-86-2); polyquaternium-22 (CAS#: 53694-17-0); polyquatemium-24 (hydroxyethylcellulose, lauryl dimethylammonium epoxide polymer); polyquatemium-27 (copolymer of polyquatemium-2 and polyquaternium-17, CAS#: 131954-48-4); polyquatemium-28 (vinylpyrrolidone, dimethylaminopropylmethacrylamide copolymer, CAS#: 131954-48-8), polyquatemium-29 (chitosan, CAS#: 9012-76-4); propylene oxide polymer reacted with epichlorohydrin); polyquaternium-30 (methylmethacrylate, methyl(dimethylacetylammoniumethyl)acrylate copolymer, (CAS#: 147398-77-4); polyquatemium-33 (CAS#: 69418-26-4); poly(ethylene(dialkyl)ammonium) polymethacrylamidopropyltrimonium chloride (CAS#: 68039-13-4); and poly(2-acryloyloxyethyl)trimethylammonium).

Inorganic cationic flocculants such as aluminum salts can also be used as the cationic coagulant or cationic flocculant. Exemplary aluminum salt based flocculants include aluminum sulfate, sodium aluminate, magnesium aluminate, basic aluminum chloride (poly aluminum chloride) and the like, Preferably, the cationic coagulant or cationic flocculant is polydimethyldiallylammonium chloride (polyDADMAC). PolyDADMAC is sold under a variety of tradenames one of which is Magnafloc 370, available from CIBA. It is preferred that the intrinsic viscosity of the cationic polymer is generally at least about 0.2, preferably in the range of about 0.5 to 3, most preferably about 0.8 to 2.4 dl/g. Expressed in terms of molecular weight, it is preferred for the molecular weight to be below about 2 million, more preferably below about 1.5 million and, most preferably, below about 1 million, although it should generally be above about 100,000 and preferably above about 500,000.

Cationic coagulants or cationic flocculants, preferably, have a cationic atom content of at least 1 wt. %, more preferably at least 3 wt. %, still more preferably at least 5 wt. %, and even more preferably at least 7 wt. %. The cationic atom content is a measure of the total atomic weight of the atoms bearing cationic charge in/on the polymer chain divided by the molecular weight of the polymer, times 100, expressed as a weight percentage. By way of descriptive example, all of the cationic nitrogen atoms in the polymer poly(DADMAC) are quaternary ammonium ions, thereby the cationic atom content (here, the cationic nitrogen content) can be determined either by elemental analysis of a sample of the poly(DADMAC) or by the weight average molecular weight of the polymer. The elemental analysis would provide the weight percentage of nitrogen atoms in a sample of polymer, that is the cationic atom content. PolyDADMAC has a cationic atom content of approximately 8.7 wt. %.

In accordance with another important feature of the present invention, it has been found that the addition of an elastomer in an amount of about 1 wt. % to about 20 wt. % based on the total weight of the swellable composition will substantially increase the handleability of the composition without reducing the sealing capability of the material. To achieve the full advantage of this embodiment of the present invention, the elastomer should be included in an amount of about 2 wt. % to about 10 wt. % based on the total weight of the composition. Surprisingly, it has been found that mastication or shearing, i.e. in a sigma blender, of a composition containing a water-swellable clay, such as bentonite, polypropene and/or polydiene and/or polybutene, and an elastomer, actually increases the capacity of the composition to swell and retain good cohesion.

Essentially any elastomer having at least 100% elongation and, in accordance with an important feature of the present invention having at least 500% elongation, can be used in the bentonite composition of the present invention to substantially improve the handleability, cohesiveness and structural integrity of the composition and articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender, i.e. sigma blender, during mastication and mixing with the other composition components. Useful non-cross linked elastomers can include styrene block copolymers (S-TPE), polyester block copolymer (COPE), polyurethanes (TPE), polyether block amides (PEBA), and newer technologies such as ethylene or propylene-based copolymers known as polyolefin elastomers (POE) and polyolefin plastomers (POP). Fully cross-linked elastomers generally are not suitable for incorporation into the compositions of the present invention since their elongation capacity is insufficient to permit full expansion of the bentonite during hydration. However, any elastomer having at least 100% elongation is suitable and included within the scope of the present invention.

To achieve the full advantage of the compositions and articles described herein, the elastomers should have an elongation of at least 500% to allow for the new and unexpected bentonite swelling discovered in accordance with the principles of the embodiment of the invention directed to intimately contacting bentonite with polypropene, polydiene and/or polybutene. Additional suitable elastomers for incorporation into the composition include elastomeric resins selected from the group consisting of but not limited to attactic polypropylene; ethylene-propylene copolymers; ethylene-butene copolymers; ethylene-hexene copolymers; ethylene-octene copolymers; ethylene-co-vinyl acetate copolymers; a terpolymer of ethylene, propylene, and a non-conjugated diene (EPDM); a copolymer of ethylene and vinyl acetate; a copolymer of ethylene and methacrylate; thermoplastic urethane; thermoplastic vulcanizate; thermoplastic polyesters; a styrene-butadiene copolymer; chlorinated polyethylene; cholorsulfonated polyethylene; nitrile rubber (NBR); synthetic and natural rubbers, halogenated butyl rubber, and partially cross-linked butyl rubbers having divinylbenzene added to form a terpolymer for the purpose of imparting a degree of "cure." The elastomer can be shredded prior to mastication with the bentonite and polypropenes and/or polybutenes to decrease mixing time although shredding is not necessary. Mastication and homogeneous flow of the elastomer throughout the bentonite composition can be achieved with the elastomer in any desired shape, i.e., pellet form, for example in a sigma blender.

In accordance with another important feature of the compositions and articles described herein, the bentonite compositions disclosed herein can include additives capable of forming a skin on the composition, such as a copolymer of vinyl toluene with a vegetable drying oil. The compositions containing skins are useful wherever the composition does not require tackiness for securing the composition to its intended location. If tackiness is desired, a surface coating of any suitable tackifier may be applied over the skin.

In accordance with still another important embodiment of the compositions and articles described herein, a water-swellable composition is provided including a water-swellable clay, such as bentonite, in an amount of about 35 wt. % to about 90 wt. %, an elastomer in an amount of about 1 wt. % to about 20 wt. %, and any plasticizer compatible with the elastomer and capable of plasticizing the elastomer, in an amount of about 8 wt. % to about 50 wt. % based on the total weight of the composition.

To achieve the full advantage of the compositions, articles and methods described herein, the composition should be flexible, e.g., when in rope form, it should be capable of being rolled upon itself for convenient unrolling into position, for example, between two adjacent concrete sections and for wrapping around conduits; the composition should have a percent swell in high salinity (4.5% by weight sea salt) water of at least 100% (at least 100% weight gain[1]); and the composition should be water-impermeable to high salinity water, that is the high salinity water should penetrate the composition at a rate of $1 \times 10^{-7}$ cm/sec or less, preferably at a rate of $5 \times 10^{-9}$ cm/sec or less as measured by ASTM D 5887.

Further, in order to achieve the full advantage, the anionic, water-insoluble acrylic copolymer/cationic polymer molar ratio should be in the range of about (0.25 to 4)/1, preferably about (0.5 to 2)/1, more preferably about (2 to 3)/2, most preferably 3/2. The cationic polymer appears to ionically interact with negative charge sites on the smectite clay and, thereby maintains the composition in a cohesive form and in proper position, where $$1 \; \frac{\text{hydrated weight} - \text{dry weight}}{\text{dry weight}} \times 100 = \geq 100\%$$

initially disposed, during swelling. However, unexpectedly, these interactions are maintained in the presence of the high electrolyte contents of high salinity salt water.

If a less viscous composition, e.g., a paste consistency, is desired in order to penetrate smaller voids and crevices, the composition can include additional polybutene, polydiene, polypropene, or other oils, e.g., in amounts of about 18 wt. % to about 35 wt. %, based on the total weight of the composition, while maintaining the clay at about 40 wt. % to about 45 wt. %, copolymer at about 9 wt. % to about 15 wt. %, and the cationic flocculant at about 14 wt. % to about 20 wt. % of the composition.

Suitable amounts and ratios of components achieve cohesiveness; high swell; and prevent disintegration during and after swelling. For example:

Preferred Extruded Composition Ranges

| Component | Name | Units | Low | High |
|---|---|---|---|---|
| smectite clay | Clay | % | 40 | 49 |
| partially cross-linked acrylamide/partially neutralized acrylic acid copolymer | Stockosorb F | % | 9 | 21 |
| cationic flocculant | Magnafloc 370 | % | 14 | 27 |
| elastomer | butyl rubber | % | 5 | 9 |
| polybutene/polypropene | polyisobutylene | % | 11 | 17 |

Examples and Results

| # | Calcium Bentonite Clay % | Stockosorb F % | Magnafloc 370 % | Butyl Rubber % | Polyisobutylene % | 168 hr Seawater Swell % Capacity | Seawater Intactness Rating (4 = best) | 168 hr DI Water Swell % Water Capacity | DI Intactness Rating (4 = best) |
|---|---|---|---|---|---|---|---|---|---|
| 1 | 40 | 10.1 | 26.6 | 6.5 | 16.8 | 213 | 4 | 172 | 4 |
| 2 | 40 | 13.4 | 26.6 | 8.8 | 11.2 | 638 | 1 | 161 | 4 |
| 3 | 40 | 13.4 | 26.6 | 8.8 | 11.2 | 503 | 1 | 133 | 4 |
| 4 | 40 | 14.4 | 26.6 | 5 | 14 | 570 | 2 | 180 | 4 |
| 5 | 40 | 16.2 | 22 | 5 | 16.8 | 413 | 3 | 149 | 4 |
| 6 | 40 | 20.8 | 13.6 | 8.8 | 16.8 | 352 | 3.5 | 626 | 3.5 |
| 7 | 40 | 20.8 | 13.6 | 8.8 | 16.8 | 568 | 1.5 | 508 | 4 |
| 8 | 40 | 20.8 | 23 | 5 | 11.2 | 951 | 1 | — | — |
| 9 | 43.8 | 20.8 | 13.6 | 5 | 16.8 | 1015 | 1 | — | — |
| 10 | 44.3 | 8.6 | 21.5 | 8.8 | 16.8 | 147 | 4 | 140 | 4 |
| 11 | 44.3 | 14.7 | 20.1 | 6.9 | 14 | 528 | 2.5 | 159 | 4 |
| 12 | 44.3 | 14.7 | 20.1 | 6.9 | 14 | 484 | 2.5 | 149 | 4 |
| 13 | 44.3 | 16.5 | 13.6 | 8.8 | 16.8 | 437 | 4 | 421 | 3.5 |
| 14 | 44.3 | 20.8 | 18.7 | 5 | 11.2 | 981 | 1 | — | — |
| 15 | 45.6 | 20.8 | 13.6 | 88 | 11.2 | 521 | 4 | 705 | 3.5 |
| 16 | 48.6 | 8.6 | 21 | 5 | 16.8 | 372 | 3.5 | 139 | 4 |
| 17 | 48.6 | 8.6 | 22.8 | 8.8 | 11.2 | 292 | 4 | 124 | 4 |
| 18 | 48.6 | 8.6 | 26.6 | 5 | 11.2 | 566 | 1 | 388 | 1 |
| 19 | 48.6 | 12.2 | 13.6 | 8.8 | 16.8 | 354 | 4 | 198 | 4 |
| 20 | 48.6 | 14.7 | 20.5 | 5 | 11.2 | 654 | 1 | 281 | 2 |
| 21 | 48.6 | 20.8 | 13.6 | 5 | 12 | 1022 | 1 | 990 | 1 |

Intactness was measured by a cohesion test. Approximately 80 grams of a salt water swellable composition was allowed to hydrate until the equilibrium swell extent was achieved, which usually occurred after one to two weeks of hydration time. The swollen sample was dropped from a height of 16 inches onto a sieve with a 9.5 millimeter opening and a wire mesh diameter of 0.34 millimeters. The percent cohesion of the sample was determined by dividing the mass of the sample caught by the screen by the mass of the sample prior to dropping and multiplying by 100. Samples where 75 to 100% of the mass was retained on the screen were given a rating of 4. Samples where 50 to 74% of the mass was retained on the screen were given a rating of 3. Samples where 25 to 49% of the mass was retained on the screen were given a rating of 2. Samples retaining less than 25% of the mass on the screen were given a rating of 1.

A plasticizer for the elastomer is an optional additive for the composition described herein. The plasticizer improves the workability of the elastomer, extends the elastomer, enables the elastomer to reposition itself with expansion of the water swellable clay when the clay is wetted and wets the clay surface sufficiently to enable the elastomer to accept substantial amounts of clay (up to about 90 wt. %) and to provide a homogeneous clay distribution throughout the elastomer.

It has been found that an elastomer having an elongation of at least 100% will permit the clay to substantially expand so long as the elastomer includes at least one plasticizer in an amount of at least 8 wt. % based on the total weight of the composition. The elastomer provides exceptionally good structural integrity to the composition without substantially inhibiting the swellability of the clay. The elastomers should be partially, but not completely, cross-linked and include, for example, butyl rubber, styrene-butadiene, other synthetic and natural rubbers, ethylene-propylene copolymers, ethylene and propylene terpolymers.

Other suitable plasticizers are the relatively low polarity plasticizers including epoxidized oils, such as epoxidized soybean oil; blown castor oil; alkyl monesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils; napthenic-paraffinic oils; and paraffinic oil.

To achieve the full advantage of this embodiment of the compositions and articles described herein, the plasticizer should be included in the composition in an amount of at least 10 wt. % of the composition to plasticize the elastomer and fully wet-out the bentonite. The plasticizers generally are included in an amount of about 15 wt. % to about 30 wt. %.

Turning now to the drawing, and initially to FIGS. 1 and 5, an apparatus is illustrated in schematic form for extruding the compositions described herein into rod and sheet forms. The composition 12 comprising an intimate mixture of a smectite clay; with polypropene and/or polydiene and/or polybutene; partially cross-linked acrylamide/partially neutralized acrylic acid copolymer; and cationic flocculant, is thoroughly blended in a homogeneous blend with an elastomer, such as butyl rubber, in sigma blender 14 to fully masticate the elastomer to provide a homogeneous clay composition into extruder 16. Auger 18 of extruder 16 forces the bentonite composition through a die opening 20 of any desired shape, for example the rod form shown in FIG. 2, to form a rectangular rope 22. The rope 22 is directed onto a conveyor 24 capable of being driven at a variety of predetermined speeds by conveyor motor 26. By varying the speed of the conveyor 24 relative to the speed at which the extruded rope 22 exits the die opening 20, the rope can be stretched or compressed slightly to vary the dimensions of the extruded clay composition. The conveyor 24 includes a suitable conveyor belt 28 and a continuous supply of release paper 30 directed over the conveyor belt 28 for contact against a surface of the rope 22 being extruded through the die opening 20 of extruder 16. The rope 22 on the release paper 30 is wound around a take up roller 32 as the rope is extruded onto the release paper to provide the composition in a coiled, rope-like form.

Similarly, as shown in FIG. 5, the extruder 16 can include an elongated die opening 34 to provide the composition in sheet form 22a, as shown in FIG. 6, and the sheets may be cut to length at a suitable cutting station (not shown) or formed into a sheet coil 35 as shown in FIG. 5. As shown in FIG. 5, the conveyor may include a second continuous supply of release paper 36 to sandwich the bentonite sheet between upper and lower release sheets. The second release paper supply 36 is particularly desirable for compositions not including an elastomer and compositions having less cohesiveness and structural integrity. In one embodiment, a water-soluble film is applied to one major surface, as manufactured and applied in accordance with this assignee's U.S. Pat. No. 5,580,630, hereby incorporated by reference.

FIGS. 3 and 4 show a portion of the rope 22 of FIG. 2 comprising a smectite clay, e.g., sodium or calcium bentonite, polypropene and/or polydiene and/or polybutene, partially cross-linked acrylamide/partially neutralized acrylic acid copolymer, cationic flocculant, and an elastomer before and after hydration. The relatively rectangular three-dimensional block 39 of FIG. 3, when hydrated with salt water, reproduced itself outwardly along every surface resulting in a central core or block having the approximate dimensions as shown in FIG. 3, surrounded by six additional blocks 40 having approximately the same dimensions. This capacity for the compositions described herein to maintain their capacity to swell outwardly from every surface is particularly useful where the composition includes the elastomeric material. An elastomeric material having at least 100% elongation is capable of stretching to flow with the expanding clay and copolymer to form surrounding, individual swollen bentonite/copolymer structures having relatively good structural integrity capable of entering any given fissures or other structural damage to seal a potential water seepage path.

It was concluded that the smectite clays should be contained in the compositions, preferably in amounts of about 40 wt. % to about 50 wt. %; the partially cross-linked acrylamide/partially neutralized acrylic acid copolymer, preferably in an amount of about 10 wt. % to about 20 wt. %; the cationic flocculant, preferably in an amount of about 5% to about 35%, more preferably about 15 wt. % to about 30 wt. %; the elastomer, preferably in an amount of about 5 wt. % to about 10 wt. %; and polybutene (or polyisobutylene) and/or polypropene (or polyisoprene), and/or polydiene, preferably in an amount of about 8 wt. % to about 17 wt. %; based on the total weight of the extrudable composition. It should be noted that clay contents of 45-50 wt. %, and higher percentages of cationic flocculant, e.g., 15-20 wt. %, together with higher percentages of elastomer, increases the intactness of the extruded compositions. Increased swell is promoted at the higher percentages of partially cross-linked acrylamide/partially neutralized acrylic acid copolymer, e.g., 15 wt. % to 20 wt. %, lower percentages of cationic flocculant, e.g., 5 wt. % to 27 wt. %, and lower percentages of smectite clay, e.g., calcium bentonite, e.g., 45 wt. % to about 50 wt. %, based on the total weight of the composition.

The invention claimed is:

1. A composition capable of swelling in salt water comprising:
   a) about 30 wt. % to about 60 wt. % of a water-swellable smectite clay;
   b) about 5 wt. % to about 25 wt. % of a partially cross-linked acrylamide/partially neutralized acrylic acid copolymer;
   c) about 3 wt. % to about 15 wt. % of at least one elastomeric resin; and
   d) about 5 wt. % to about 35 wt. % of a cationic polymeric quaternary flocculant.

2. The composition of claim 1, wherein the partially cross-linked acrylamide/partially neutralized acrylic acid copolymer contains about 5 mole % to about 95 mole % acrylamide, and further including a primary polyolefin plasticizer selected from the group consisting of polypropene, polybutene, polyisoprene, polydiene, polyisobutylene, mixtures, and copolymers thereof.

3. The composition of claim 2, wherein the partially cross-linked acrylamide/partially neutralized acrylic acid copolymer contains about 15 mole % to about 80 mole % acrylamide.

4. The composition of claim 3, wherein the partially cross-linked acrylamide/partially neutralized acrylic acid copolymer contains about 55 mole % to about 75 mole % acrylamide.

5. The composition of claim 4, wherein the partially cross-linked acrylamide/partially neutralized acrylic acid copolymer contains about 60 mole % to about 70 mole % acrylamide.

6. The composition of claim 1, wherein the copolymer comprises a water-insoluble partially cross-linked acrylamide neutralized acrylic acid/acrylic acid copolymer.

7. The composition of claim 2, wherein the primary plasticizing agent is a straight chain or branched polyolefin selected from the group consisting of $(C_3H_6)_n$, wherein n is about 7 to about 60; $(C_4H_8)_m$, wherein m is about 6 to about 45; $(C_5H_8)_x$, wherein x is about 100 to about 1100; and $(C_4H_6)_y$, wherein y is about 100 to about 1100 and combinations thereof.

8. The composition of claim 2 wherein a secondary plasticizing agent is included in the composition in an amount of about 4 wt. % to about 20 wt. %, said secondary plasticizing agent being selected from epoxidized soybean oil; blown castor oil; dioctyl adipate; butyl cellosolve oleate; long chain ($C_6$-$C_{30}$) partial ether esters; long chain ($C_6$-$C_{30}$) alkyl diesters; and petroleum-derived plasticizers.

9. The composition of claim 1, wherein the partially cross-linked acrylamide/partially neutralized acrylic acid copolymer is identified by the CAS #31212-13-2.

10. The composition of claim 1, wherein the clay has a particle size such that at least 60% of the particles pass through a #200 mesh sieve (ASTM D 422).

11. The composition of claim 9, wherein at least 70% of the particles pass through a #200 mesh sieve.

12. The composition of claim 1, wherein the partially cross-linked acrylamide/partially neutralized acrylic acid copolymer has a particle size such that at least 90% of the particles have a size in the range of about 1 micron to about 4000 microns.

13. The composition of claim 11, wherein the partially cross-linked acrylamide/partially neutralized acrylic acid copolymer has a particle size is in the range of about 1 micron to about 200 microns.

14. The composition of claim 1, wherein the salt water contains ions selected from the group consisting of $Na^+$, $Mg^{++}$, $Ca^{++}$, $Al^{++}$ and combinations thereof.

15. The composition of claim 1, wherein the elastomer comprises butyl rubber.

16. The composition of claim 1 wherein the elastomeric resin comprises a blend of a pre-crosslinked and non-crosslinked elastomers.

17. The composition of claim 1, wherein the smectite clay comprises calcium bentonite clay.

18. A method of water proofing a surface from contact with a water source having a conductivity of at least 15 mS/cm comprising disposing the composition of claim 1, such that the composition contacts the water source.

19. A sealed concrete structure comprising two adjacent concrete sections containing the composition of claim 1 disposed in contact with both concrete sections to seal against passage of salt water therebetween.

20. A salt water barrier article comprising the composition of claim 1 adhered to a woven or non-woven geotextile fabric.

21. The article of claim 20, further including an outer layer of a polymeric film or sheet material in contact with the composition on a side opposite the geotextile fabric.

22. The article of claim 21, wherein the outer layer is a release sheet that is peeled from the article prior to disposing the article in position to seal an area against water passage therethrough.

23. The article of claim 19, wherein the composition includes a water-soluble outer layer.

24. The composition of claim 1, further including about 0.5 wt % to about 25 wt. % of at least one primary plasticizing agent for the elastomeric resin.

25. The composition of claim 1, wherein the polymeric quaternary flocculant is selected from the group consisting of polyquaternium-1 (CAS#: 68518-54-7); polyquaternium-2 (CAS#: 63451-27-1); polyquaternium-4 (copolymer of hydroxyethylcellulose and diallyldimethyl ammonium chloride); polyquaternium-5 (CAS#: 26006-22-4); polyquaternium-6 (polyallyldimethylammonium chloride; polydimethyldiallylammonium chloride; polyquaternium-7 (CAS#: 26590-05-6); polyquaternium-8 (poly((methyl, stearyl) dimethylaminoethyl methacrylate), polyquaternium-9 (polydimethylaminoethylmethacrylate bromide); polyquaternium-10 (CAS#s: 53568-66-4, 55353-19-0, 54351-50-7, 81859-24-7; 68610-92-4, 81859-24-7); polyquaternium-11 (polyvinyl-N-ethyl-methylpyrrolidonium); poly(ethyldimethylammoniumethylmethacrylate) sulfate copolymer), polyquaternium-12 (CAS#: 68877-50-9); polyquaternium-13 (CAS#: 68877-47-4); polyquaternium-14 (CAS#: 27103-90-8); polyquaternium-15 (CAS#: 35429-19-7); polyquaternium-16 (quaternary ammonium salt of methyl-vinylimidazolium chloride and vinylpyrrolidone) (CAS#: 95144-24-4); polyquaternium-17 (adipic acid-dimethylaminopropylamine polymer (CAS#: 90624-75-2); polyquaternium-18 (azelaic acid, dimethylaminopropylamine, dicholorethylether polymer, CAS#: 113784-58-0); polyquaternium-19 (polyvinyl alcohol, 2,3-epoxypropylamine polymer (CAS#: 110736-85-1); polyquaternium-20 (polyvinyl octadecylether, 2,3-epoxypropylamine polymer (CAS#: 110736-86-2); polyquaternium-22 (CAS#: 53694-17-0); polyquaternium-24 (hydroxyethylcellulose, lauryl dimethylammonium epoxide polymer); polyquaternium-27 (copolymer of polyquaternium-2 and polyquaternium-17, CAS#: 131954-48-4); polyquaternium-28 (vinylpyrrolidone, dimethylaminopropylmethacrylamide copolymer, CAS#: 131954-48-8), polyquaternium-29 (chitosan, CAS#: 9012-76-4); propylene oxide polymer reacted with epichlorohydrin); polyquaternium-30 (methylmethacrylate, methyl(dimethylacetylammoniumethyl)acrylate copolymer, (CAS#: 147398-77-4); polyquaternium-33 (CAS#: 69418-26-4); poly(ethylene(dialkyl)ammonium) polymethacrylamidopropyltrimonium chloride (CAS#: 68039-13-4); and poly(2-acryloyloxyethyl)trimethylammonium).

26. The composition of claim 25, wherein the polymeric quaternary flocculant comprises polydimethyldiallylammonium chloride.

27. The method of claim 18, wherein the composition further includes about 0.5 wt % to about 25 wt. % of at least one primary plasticizing agent for the elastomeric resin.

28. The method of claim 27, wherein the polymeric quaternary flocculant is selected from the group consisting of polyquaternium-1 (CAS#: 68518-54-7); polyquaternium-2 (CAS#: 63451-27-1); polyquaternium-4 (copolymer of hydroxyethylcellulose and diallyldimethyl ammonium chloride); polyquaternium-5 (CAS#: 26006-22-4); polyquaternium-6 (polyallyldimethylammonium chloride; polydimethyldiallylammonium chloride; polyquaternium-7 (CAS#: 26590-05-6); polyquaternium-8 (poly((methyl, stearyl) dimethylaminoethyl methacrylate), polyquaternium-9 (polydimethylaminoethylmethacrylate bromide); polyquaternium-10 (CAS#s: 53568-66-4, 55353-19-0, 54351-50-7, 81859-24-7; 68610-92-4, 81859-24-7); polyquaternium-11 (polyvinyl-N-ethyl-methylpyrrolidonium); poly(ethyldimethylammoniumethylmethacrylate) sulfate copolymer), polyquaternium-12 (CAS#: 68877-50-9); polyquaternium-13 (CAS#: 68877-47-4); polyquaternium-14 (CAS#: 27103-90-8); polyquaternium-15 (CAS#: 35429-19-7); polyquaternium-16 (quaternary ammonium salt of methyl-vinylimidazolium chloride and vinylpyrrolidone) (CAS#: 95144-24-4); polyquaternium-17 (adipic acid-dimethylaminopropylamine polymer (CAS#: 90624-75-2); polyquaternium-18 (azelaic acid, dimethylaminopropylamine, dicholorethylether polymer, CAS#: 113784-58-0); polyquaternium-19 (polyvinyl alcohol, 2,3-epoxypropylamine polymer (CAS#: 110736-85-1); polyquaternium-20 (polyvinyl octadecylether, 2,3-epoxypropylamine polymer (CAS#: 110736-86-2); polyquaternium-22 (CAS#: 53694-17-0); polyquaternium-24 (hydroxyethylcellulose, lauryl dimethylammonium epoxide polymer); polyquaternium-27 (copolymer of polyquaternium-2 and polyquaternium-17, CAS#: 131954-48-4); polyquaternium-28 (vinylpyrrolidone, dimethylaminopropylmethacrylamide copolymer, CAS#: 131954-48-8), polyquaternium-29 (chitosan, CAS#: 9012-76-4); propylene oxide polymer reacted with epichlorohydrin); polyquaternium-30 (methylmethacrylate, methyl(dimethylacetylammoniumethyl)acrylate copolymer, (CAS#: 147398-77-4); polyquaternium-33 (CAS#: 69418-26-4); poly(ethylene(dialkyl)ammonium) polymethacrylamidopropyltrimonium chloride (CAS#: 68039-13-4); and poly(2-acryloyloxyethyl)trimethylammonium).

29. The method of claim 28, wherein the polymeric quaternary flocculant comprises polydimethyldiallylammonium chloride.

30. The sealed concrete structure of claim 19, wherein the composition further includes about 0.5 wt % to about 25 wt. % of at least one primary plasticizing agent for the elastomeric resin.

31. The sealed concrete structure of claim 30, wherein the polymeric quaternary flocculant is selected from the group consisting of polyquaternium-1 (CAS#: 68518-54-7); polyquaternium-2 (CAS#: 63451-27-1); polyquaternium-4 (copolymer of hydroxyethylcellulose and diallyldimethyl ammonium chloride); polyquaternium-5 (CAS#: 26006-22-4); polyquaternium-6 (polyallyldimethylammonium chloride; polydimethyldiallylammonium chloride; polyquaternium-7 (CAS#: 26590-05-6); polyquaternium-8 (poly((methyl, stearyl) dimethylaminoethyl methacrylate), polyquaternium-9 (polydimethylaminoethylmethacrylate bromide); polyquaternium-10 (CAS#s: 53568-66-4, 55353-19-0, 54351-50-7, 81859-24-7; 68610-92-4, 81859-24-7); polyquaternium-11 (polyvinyl-N-ethyl-methylpyrrolidonium); poly(ethyldimethylammoniumethylmethacrylate) sulfate copolymer), polyquaternium-12 (CAS#: 68877-50-9); polyquaternium-13 (CAS#: 68877-47-4); polyquaternium-14 (CAS#: 27103-90-8); polyquaternium-15 (CAS#: 35429-19-7); polyquaternium-16 (quaternary ammonium salt of methyl-vinylimidazolium chloride and vinylpyrrolidone) (CAS#: 95144-24-4); polyquaternium-17 (adipic acid-dimethylaminopropylamine polymer (CAS#: 90624-75-2); polyquaternium-18 (azelaic acid, dimethylaminopropylamine, dicholorethylether polymer, CAS#: 113784-58-0); polyquaternium-19 (polyvinyl alcohol, 2,3-epoxypropylamine polymer (CAS#: 110736-85-1); polyquaternium-20 (polyvinyl octadecylether, 2,3-epoxypropylamine polymer (CAS#: 110736-86-2); polyquaternium-22 (CAS#: 53694-17-0); polyquaternium-24 (hydroxyethylcellulose, lauryl dimethylammonium epoxide polymer); polyquaternium-27 (copolymer of polyquaternium-2 and polyquaternium-17, CAS#: 131954-48-4); polyquaternium-28 (vinylpyrrolidone, dimethylaminopropylmethacrylamide copolymer, CAS#: 131954-48-8), polyquaternium-29 (chitosan, CAS#: 9012-76-4); propylene oxide polymer reacted with epichlorohydrin); polyquaternium-30 (methylmethacrylate, methyl(dimethylacetylammoniumethyl)acrylate copolymer, (CAS#: 147398-77-4); polyquaternium-33 (CAS#: 69418-26-4); poly(ethylene(dialkyl)ammonium)polymethacrylamidopropyltrimonium chloride (CAS#: 68039-13-4); and poly(2-acryloyloxyethyl)trimethylammonium).

32. The sealed concrete structure of claim 31, wherein the polymeric quaternary flocculant comprises polydimethyldiallylammonium chloride.

\* \* \* \* \*